United States Patent
Mount

(10) Patent No.: US 9,305,438 B2
(45) Date of Patent: Apr. 5, 2016

(54) POS NETWORK INCLUDING PRINTING AND HIGHLIGHTING

(75) Inventor: Jeffrey Mount, Palm Harbor, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 960 days.

(21) Appl. No.: 11/680,938

(22) Filed: Mar. 1, 2007

(65) Prior Publication Data

US 2007/0206209 A1 Sep. 6, 2007

Related U.S. Application Data

(60) Provisional application No. 60/778,410, filed on Mar. 3, 2006.

(51) Int. Cl.
G06F 3/12 (2006.01)
G07G 5/00 (2006.01)
G06Q 20/20 (2012.01)
G06F 15/00 (2006.01)

(52) U.S. Cl.
CPC . *G07G 5/00* (2013.01); *G06Q 20/20* (2013.01)

(58) Field of Classification Search
None
See application file for complete search history.

(56) References Cited

U.S. PATENT DOCUMENTS

| 3,925,788 A | 12/1975 | Kashio | 346/75 |
| 4,261,036 A | 4/1981 | Nagasaka et al. | 364/405 |
| 4,980,725 A | 12/1990 | Sumida | |
| 5,456,539 A | 10/1995 | Wright et al. | |
| 5,570,451 A | 10/1996 | Sakaizawa et al. | |
| 5,619,558 A | 4/1997 | Jheeta et al. | 379/90 |
| 5,633,662 A | 5/1997 | Allen et al. | |
| 5,634,090 A | 5/1997 | Narukawa et al. | 395/115 |
| 5,666,215 A | 9/1997 | Fredlund et al. | |
| 5,688,154 A | 11/1997 | Goda et al. | |
| 5,737,729 A | 4/1998 | Denman | |
| 5,767,886 A | 6/1998 | Kawakami et al. | |
| 5,857,175 A | 1/1999 | Day et al. | |
| 5,917,513 A | 6/1999 | Miyauchi et al. | |
| 6,021,362 A | 2/2000 | Maggard et al. | 700/234 |
| 6,076,068 A | 6/2000 | De Lapa et al. | |
| 6,119,933 A | 9/2000 | Wong et al. | 235/380 |
| 6,129,274 A | 10/2000 | Suzuki | 235/381 |

(Continued)

FOREIGN PATENT DOCUMENTS

| CN | 1702695 | 11/2005 |
| EP | 0928698 | 7/1998 |

(Continued)

OTHER PUBLICATIONS

Nov. 9, 2007 ,PCT International Search Report PCT/US07/63051.

(Continued)

*Primary Examiner* — Mohammad Ghayour
*Assistant Examiner* — Pawandeep Dhingra
(74) *Attorney, Agent, or Firm* — Sheppard Mullin Richter & Hampton LLP

(57) ABSTRACT

The invention provides for optional printing at a pont of sale (POS). The invention provides a system and computer implemented method for printing information at a POS relating to a purchase transaction at the POS, comprising printing a second alternative instead of a default print, or printing both a default and a second print, in both cases dependent upon the second print being timely delivered to the POS printer. Preferably, the second print depends upon processing business rules related to color in the print.

39 Claims, 5 Drawing Sheets

(56) References Cited

U.S. PATENT DOCUMENTS

| | | | |
|---|---|---|---|
| 6,151,038 A | 11/2000 | Suzuki | |
| 6,203,131 B1 | 3/2001 | Wiklof | |
| 6,231,249 B1 | 5/2001 | Harris | |
| 6,246,997 B1 | 6/2001 | Cybul et al. | 705/27 |
| 6,252,673 B1 | 6/2001 | Miyasaka et al. | 358/1.18 |
| 6,313,925 B1 | 11/2001 | Decker et al. | |
| 6,341,269 B1 | 1/2002 | Dulaney et al. | 705/22 |
| 6,344,899 B1 | 2/2002 | Tabata et al. | |
| 6,351,735 B1 | 2/2002 | Deaton et al. | |
| 6,415,261 B1 | 7/2002 | Cybul et al. | 705/14 |
| 6,663,304 B2 | 12/2003 | Vives et al. | 400/82 |
| 6,721,613 B1 | 4/2004 | Yamamoto et al. | 700/90 |
| 6,767,073 B2 | 7/2004 | Tschida | |
| 7,014,110 B2* | 3/2006 | Minowa et al. | 235/383 |
| 7,145,673 B1* | 12/2006 | Lin | 358/1.15 |
| 7,156,304 B2* | 1/2007 | Minowa et al. | 235/383 |
| 7,424,443 B2 | 9/2008 | Yanagisawa et al. | 705/24 |
| 7,689,461 B2 | 3/2010 | Minowa | 705/24 |
| 7,708,360 B2* | 5/2010 | Byerly et al. | 347/2 |
| 7,914,213 B2 | 3/2011 | Scarton | 400/76 |
| 8,159,709 B2* | 4/2012 | Young et al. | 358/1.16 |
| 8,764,138 B2 | 7/2014 | Byerly et al. | 347/2 |
| 8,964,244 B2 | 2/2015 | Mount et al. | 358/1.9 |
| 2001/0021331 A1 | 9/2001 | Brewington et al. | |
| 2001/0032128 A1 | 10/2001 | Kepecs | 705/14 |
| 2001/0032130 A1 | 10/2001 | Gabos et al. | 705/14 |
| 2001/0034775 A1 | 10/2001 | Minowa | 709/218 |
| 2002/0109729 A1 | 8/2002 | Dutta | 345/790 |
| 2002/0120514 A1 | 8/2002 | Hagmeier et al. | 705/14 |
| 2002/0129002 A1 | 9/2002 | Alberts et al. | |
| 2002/0143655 A1 | 10/2002 | Elston et al. | |
| 2003/0023492 A1 | 1/2003 | Riordan et al. | 705/16 |
| 2003/0036979 A1 | 2/2003 | Tokorotani | 705/27 |
| 2003/0046154 A1 | 3/2003 | Larson et al. | 705/14 |
| 2003/0050842 A1 | 3/2003 | Wada et al. | |
| 2003/0061100 A1 | 3/2003 | Minowa | 705/14 |
| 2003/0081238 A1* | 5/2003 | Lester et al. | 358/1.14 |
| 2003/0101095 A1 | 5/2003 | Suzuki | |
| 2003/0121929 A1 | 7/2003 | Liff et al. | |
| 2003/0197782 A1* | 10/2003 | Ashe et al. | 348/150 |
| 2003/0227510 A1* | 12/2003 | Payne | 347/37 |
| 2004/0004644 A1 | 1/2004 | Komatsu et al. | |
| 2004/0030600 A1 | 2/2004 | Lacroix | 705/16 |
| 2004/0034570 A1* | 2/2004 | Davis | 705/26 |
| 2004/0046971 A1 | 3/2004 | Lapstun et al. | 358/1.1 |
| 2004/0054583 A1 | 3/2004 | Nye, III et al. | 705/14 |
| 2004/0059634 A1 | 3/2004 | Tami et al. | 705/17 |
| 2004/0109190 A1* | 6/2004 | Nagai | 358/1.13 |
| 2004/0148223 A1 | 7/2004 | Ghaffar et al. | |
| 2004/0227972 A1* | 11/2004 | Uchikawa | 358/1.14 |
| 2004/0246287 A1 | 12/2004 | Usuda | |
| 2005/0040230 A1* | 2/2005 | Swartz et al. | 235/383 |
| 2005/0080651 A1 | 4/2005 | Morrison et al. | |
| 2005/0171845 A1 | 8/2005 | Halfman et al. | 705/14 |
| 2005/0242178 A1* | 11/2005 | Minowa | 235/383 |
| 2005/0247781 A1* | 11/2005 | Minowa et al. | 235/383 |
| 2005/0264850 A1 | 12/2005 | Kim et al. | |
| 2005/0270550 A1* | 12/2005 | Sumio | 358/1.13 |
| 2005/0271446 A1* | 12/2005 | Minowa | 400/621 |
| 2006/0126102 A1 | 6/2006 | Sakuda | 358/1.15 |
| 2006/0143075 A1* | 6/2006 | Carr et al. | 705/14 |
| 2006/0287872 A1 | 12/2006 | Simrell | 705/1 |
| 2006/0289633 A1 | 12/2006 | Moreland et al. | 235/381 |
| 2007/0045405 A1 | 3/2007 | Rothschild | |
| 2007/0120943 A1 | 5/2007 | Van Demark et al. | 347/221 |
| 2007/0206209 A1 | 9/2007 | Mount | |
| 2007/0221728 A1 | 9/2007 | Ferro et al. | 235/383 |
| 2014/0312111 A1 | 10/2014 | Byerly et al. | 235/3 |

FOREIGN PATENT DOCUMENTS

| | | | |
|---|---|---|---|
| EP | 1292096 | 3/2003 | |
| EP | 1321307 | 6/2003 | |
| EP | 1267565 | 12/2003 | |
| EP | 1 467 301 | 10/2004 | |
| FR | 2 548 805 | 1/1985 | |
| JP | 2-207397 A | 8/1990 | |
| JP | 10-214383 | 8/1998 | |
| JP | H10-214383 | 8/1998 | |
| JP | 11-212527 | 8/1999 | |
| JP | H11-212527 | 8/1999 | |
| JP | 2000-105786 | 4/2000 | |
| JP | 2000105786 A * | 4/2000 | G06F 17/60 |
| JP | 2002-14917 | 1/2002 | |
| JP | 2002-234215 | 8/2002 | |
| JP | 2004-013708 | 1/2004 | |
| JP | 2004098503 | 4/2004 | |
| JP | 2005-182396 | 7/2005 | |
| JP | 2005-335125 | 12/2005 | |
| JP | 2005-343028 | 12/2005 | |
| WO | WO 98/21713 | 5/1998 | |

OTHER PUBLICATIONS

Dec. 26, 2007, PCT International Search Report PCT/US06/30716.
Dec. 26, 2007, PCT Written Opinion PCT/US06/30716.
Nov. 9, 2007, PCT Written Opinion of the ISA PCT/US07/63051.
Supplemental European Search Report dated Feb. 4, 2011 in related application 06789518.
Abstracts of Japan, publication No. 2004098503, published Apr. 2, 2004.
Office action in related application CA 2,624,622, dated Jul. 11, 2011.
Nov. 9, 2007, PCT International Search Report PCT/US07/63051.
Nov. 9, 2007, PCT Written Opinion PCT/US07/63051.
Dec. 26, 2007, PCT International Search Report PCT/US06/26313.
Dec. 26, 2007, PCT Written Opinion PCT/US06/26313.
Jun. 17, 2008, PCT International Search Report PCT/US06/30716.
Jun. 17, 2008, PCT Written Opinion PCT/US06/30716.
Aug. 15, 2007, PCT International Search Report PCT/US06/11843.
Aug. 15, 2007, PCT Written Opinion of the ISA PCT/US06/11843.
Jun. 10, 2009, European Search Report EP 06 78 6463.
Jul. 19, 2007, Claims filed by amendment filed Apr. 7, 2009 in U.S. Appl. No. 11/366,397.
Jun. 7, 2007, Claims allowed by Notice of Allowance mailed Dec. 16, 2009 in U.S. Appl. No. 11/488,126.
Claims filed Jan. 22, 2010 in application U.S. Appl. No. 12/692,419.
Jun. 7, 2007, Claims filed by preliminary amendment filed Jun. 3, 2008 in U.S. Appl. No. 11/481,789.
English translation of Feb. 5, 2010 Chinese office action in related case, application No. CN 200680045022.3.
Extended European Search Report in EP 09012094, dated Nov. 9, 2009.
US Office Action dated Apr. 16, 2010 in related U.S. Appl. No. 11/481,789.
English translation of Mar. 11, 2010 Chinese office action in related case, application No. CN 200680045132.X.
English translation of Mar. 2, 2010 Chinese office action in related case, application No. CN 200780005831.6.
CIPO office action dated May 19, 2010 in related case CA 2,624,620.
Jul. 13, 2010, CIPO office action dated Jul. 13, 2010 in related case CA 2,637,946.
European Search Report dated Aug. 13, 2010 in related case EP 06786463.7.
English translation of Abstract EP 09012094.0.
European Office Action dated Dec. 12, 2011 in EP Application No. 09012094.0, 6 pages.
Chinese Office Action dated Dec. 16, 2011 in Application No. CN 200680045022.3, with English translation, 9 pages.
Canadian Office Action dated Feb. 10, 2012 in Application No. CA 2,637,946, 4 pages.
European Office Action dated Feb. 17, 2012 in Application No. EP 06786463.7, 6 pages.
U.S. Office Action dated Mar. 29, 2012 in U.S. Appl. No. 12/692,419, 16 pages.
U.S. Office Action dated Mar. 30, 2012 in U.S. Appl. No. 11/481,789, 10 pages.

(56) References Cited

OTHER PUBLICATIONS

Japanese Office Action dated May 15, 2012 in Application No. JP 2008-557494, with English translation, 6 pages.
Japanese Office Action dated May 29, 2012 in Application No. JP 2008-544322, with English translation, 6 pages.
Japanese Office Action dated May 29, 2012 in Application No. JP 2008-544317, with English translation, 5 pages.
Chinese Office Action dated Jun. 15, 2012 in Application No. CN 200680045022.3, with English translation, 12 pages.
U.S. Office Action dated Jun. 25, 2012 in U.S. Appl. No. 12/758,901, 10 pages.
U.S. Notice of Allowance dated Sep. 4, 2012 in U.S. Appl. No. 11/481,789, 7 pages.
Japanese Office Action dated Oct. 9, 2012 in Application No. JP 2008-544322, with English translation, 4 pages.
Chinese Office Action dated Oct. 9, 2012 in Application No. Cn 200680045022.3, with English translation, 14 pages.
Canadian Office Action dated Oct. 29, 2012 in Application No. CA 2,624,622, 3 pages.
Japanese Office Action dated Nov. 1, 2012 in Application No. JP 2008-557494, with English translation, 4 pages.
U.S. Office Action dated Nov. 8, 2012 in U.S. Appl. No. 12/692,419, 20 pages.
U.S. Office Action dated Mar. 18, 2013 in U.S. Appl. No. 12/758,901, 12 pages.
Canadian Office Action dated Mar. 21, 2013 in Application No. CA 2,637,946, 5 pages.
U.S. Office Action dated May 29, 2013 in U.S. Appl. No. 12/692,419, 17 pages.
U.S. Office Action dated Jul. 19, 2013 in U.S. Appl. No. 12/758,901, 18 pages.
U.S. Office Action dated Jan. 3, 2014 in U.S. Appl. No. 12/692,419, 10 pages.
U.S. Notice of Allowance dated Mar. 3, 2014 in U.S. Appl. No. 12/692,419, 9 pages.
Chinese Office Action dated Mar. 19, 2014 in Application No. CN 201110360158.6, 16 pages.
U.S. Office Action dated Aug. 1, 2014 in U.S. Appl. No. 12/758,901, 21 pages.
European Office Action dated Sep. 2, 2014 in Application No. 07757700.5, 5 pages.
U.S. Notice of Allowance dated Oct. 20, 2014 in U.S. Appl. No. 12/758,901, 31 pages.
European Office Action dated Feb. 24, 2015 in Application No. 06786463.7, 6 pages.
Anonymous: "SVG.Open/Carto.net 2002, Zurich, SVG as a Page Description Language", Feb. 18, 2015, XP055170440, Retrieved from the Internet: URL: http://www.svgopen.org/2002/papers/danilo_fujisawa_svg_as_page_description_language/ [retrieved on Deb. 18, 2015], 11 pages.

* cited by examiner

POS NETWORK INCLUDING PRINTING AND HIGHLIGHTING

CROSS REFERENCE TO RELATED APPLICATIONS

This application claims priority to U.S. provisional application 60/778,410 filed Mar. 3, 2006, entitled "POS Network Including Color Printing and Color Highlighting"

ACRONYMS USED IN THIS APPLICATION

Point Of Sale—POS
Computer System—CS
Universal Product Code—UPC
Consumer IDentification—CID

DEFINITIONS OF BACKGROUND TERMS

Point of sale means a location where a sales transaction occurs.

Universal product code UPC means any code used to uniquely identify a product item, including the original UPC specification and subsequent variations and expansions thereupon.

Transaction data means data for a transaction, such as a transaction transacted at a POS. Transaction data includes UPC codes for product items purchased, product description, manufacturer, brand name, prices of those items, CID associated with the transaction, POS identifier (lane), date, time, discounts, coupon identifications, cashier identification, payment type, etc.

Individual transaction data means transaction data associated with a single transaction. Individual transaction data need not include all of the foregoing elements described for transaction data.

Print file for a printer means a file containing instructions in the printers native instruction set and all data to be contained in the printout by the printer of the print file.

Print data for a printer means data containing instructions for a printer including references to data objects stored by the printer, other than printer glyphs and individual text characters.

Printer glyphs are image objects used by printers to form text characters of font sets.

Computer system means one or more digital computers networked together.

BACKGROUND OF THE INVENTION

In the prior art, combined POS and incentive offer generation CSs include a store controller CS and an incentive CS both located at a retail store in which the retail store in which the store controller CS operates. The store controller CS received the transaction data from the POS terminals from which it can track the inventory for that retail store, and provide to the POS terminals product pricing information for products identified at the POS terminals. For large retail stores, there are plural POS terminals. The store controller CS typically stores price, product item stock, and accounting information for the retail store, and transaction data obtained from the POS terminals in that retail store. The POS terminals may be specialized CSs performing POS terminal functions. Those functions included acquiring individual transaction data, transmitting the data to the store controller CS, and generating a printed register or sales receipt.

In the prior art, there is a POS black ink printer at each POS for printing register or sales receipts for each customer conducting an individual purchase transaction at the POS. At each POS there is a bar code reader for reading into the POS terminal UPCs, CIDs, and a magnetic strip reader for reading payment account identifications, such as customer credit or debit card number. These readers at the POS and the POS terminal are functionally interrelated so that the POS terminal may acquire the read data. There may also be readers associated with the POS designed to read checking account number from checks and biometric data, and to pass that information to the POS terminal. In the prior art, all of the POS terminals communicate with a store controller CS via network connections.

In the prior art, there is also an incentive CS located at the retail store. The incentive CS has a network connection to the network segment connecting the POS controller CS to the POS terminals. This enables the incentive CS to listen to the network traffic between the POS terminals and the POS controller CS. The incentive CS stores enough of the specification of the store controller CS to be able to decode the network traffic to determine lane, UPC, CID, and end of transaction data. This allows the incentive CS to obtain individual transaction data.

In the prior art, the incentive CSs had a means (either dial up or network connection to the Internet) to communicate with a central CS to provide individual transaction data, and other data, thereto. The central CS transmitted awards data to the incentive CS. Awards data includes a CID in association with incentive data. Incentive data is for example instructions for printing an incentive offer, a such as a coupon. The awards data may include a UPC for a product having the discount to be offered by the coupon.

The prior art systems did not include the novel features, network structure, processing, or business rules, and business methods, related to default and second printing, discussed below.

SUMMARY OF THE INVENTION

It is an object of the invention to provide systems and computer implemented methods for printing information.

The inventor conceived of using a printer, preferably a color printer, at a POS, to print receipts, data structures to store related graphics, and hardware to apply certain printer receipt related business rules (herein after business rules), for individual transactions occurring at each POS. Execution of some of the business rules results in generation of a default and a second print file, or default and second print data, and transmission of the default and second print file or print data to the printer at the POS. Some of the rules and the preferred embodiment relate to a color printer since they involve printing of color highlighting, such as water marking, and printing different colors.

Retail Store Network Configuration

The invention provides local retail store network architectures that enable a CS, preferably an incentive CS, to obtain data upon which it runs business rules to generate a second print file or second print data, and to send that second print file or second print data to a POS printer at a POS, in addition to a default print file or default print data sent to the POS printer. The data used to generate the first and second print files or print data includes individual transaction data, and optionally awards data and updated business rules data.

Alternative retail store CS network architectures include a network line connecting from the incentive CS to:

A—a line on which the prior art incentive CS listens to the network traffic in the POS CS;
B—a data line connecting the terminal CS to a network segment to which the incentive CS connects;
C—a data line connecting to the data line from the terminal POS to the printer; or
D—a data line connecting to both the incentive CS and the printer.

The data line D connecting to both the incentive CS and the printer preferably connects to a USB port on the printer.

The functional requirement of embodiments employing an incentive CS is to enable the incentive CS to obtain the transaction data from the POS and provide data to the printer, preferably a color printer, associated with the POS terminal at that POS.

In all embodiments, the POS printer may determine the origin of a print file sent to it by either a network address associated with the print file, or by a flag value associated with the print file, and a lookup table in the printer logic indicating by network address or flag value the origin of the print file.

In all embodiments, a CS refers to at least one central processing unit (CPU), memory the CPU accesses, and an operating system enabling the CPU, the memory, and optional input output (I/O devices to function based upon non operating system code.

In those instances where it is noted that a printer performs processing, the printer includes a CPU and memory accessible by the CPU of the printer enabling the printer to perform the indicated functions. The printer also includes printing hardware for printing to paper.

Reference to separate elements communicating with one another including the store controller POS, the incentive CS, the POS terminal, and the printer, indicates network communication between these elements employing one or more network protocols.

In all embodiments, optionally the CS generating the second print file or second print data, does not send that second print file or second print data to a printer if the second print file or second print data is not sent by a predetermined send time. The predetermined send time is either based upon a time starting from a time of completion of the transaction associated with the individual transaction data, or a time starting with receipt of individual transaction data by the CS generating the second print file or second print data.

FIRST EMBODIMENT

In one alternative, the POS terminal or the store controller CS generates a default print file for printing a sales receipt for an individual transaction completed at a POS, and transmits that default print file to the POS printer at that POS. The POS printer is programmed to cache the default print file it received form the POS terminal for a predetermined period of time, a wait time period, such as 1, 2, of 5 seconds, while it awaits data from the incentive CS. If the POS printer receives a second print file from the incentive CS prior to the predetermined period of time, the POS printer is configured to print the second print file it received from the incentive CS and not print the default print file it received from the POS terminal or the store controller CS. If the POS printer does not receive the second print file from the incentive CS within the predetermined period of time, the POS printer is configured to print the default print file received from the POS terminal or the store controller CS, and to not print the second print file.

SECOND EMBODIMENT

In a related alternative, the POS terminal or the store controller CS generates default printer data for transmission to the printer, and the POS printer uses that default printer data to look up additional data in a local printer database in the printer to generate a default print file including a sales receipt, and prints the default print file containing the sales receipt for the individual transaction completed at the POS terminal. The POS printer is programmed to cache either the default print data it receives from the POS terminal or the default print file the printer generates, for a predetermined period of time, such as 1, 2, of 5 seconds, while it awaits data from the incentive CS. If the POS printer receives second print data from the incentive CS for printing a sales receipt prior to the predetermined period of time, the POS printer uses that second print data to look up additional data in a local printer database to generate a second print file including a sales receipt, and the POS printer prints the second print file including the sales receipt for the individual transaction completed at the corresponding POS, and it does not print the default. If the POS printer does not receive the second print data from the incentive CS within the predetermined period of time, the POS printer is configured to print from the default.

THIRD EMBODIMENT

In a related alternative, the POS printer may be configured to either receive print files, or use print data it receives to look up additional data in a local printer database to generate print files, from either or both of the incentive CS and the alternative source of data, either the POS terminal or the store controller CS. That is, the POS printer may receive any combination of either or both of print data or print files corresponding to the default print data or file, and any combination of the second print data or file.

FOURTH EMBODIMENT

In one alternative, the POS terminal is programmed to transmit the default print file or default printer data it generated to both the POS printer and to the incentive CS. The incentive CS then uses that default printer file or default printer data to determine the individual transaction data for the individual transaction and to implement its business rules on that individual transaction data, and the incentive CS subsequently transmits a second print file or second printer data, which is based upon implementation of its business rules on that transaction data, to the POS printer.

FIFTH EMBODIMENT

In one alternative, the store controller CS or the POS terminal assumes the functions of the incentive CS, in which case the incentive CS is redundant and not necessary. In this alternative, the store controller CS of the POS terminal stores the data indicated above for the incentive CS, and the store controller CS of the POS terminal transmits to the POS printer the data indicated above as being transmitted by the incentive CS. If the store controller CS assumes the functions of the incentive CS, it may receive the default print file or default print data indicated above as being sent to the incentive CS.

SIXTH EMBODIMENT

In one alternative, the POS printer assumes the functions noted above for the incentive CS. In this embodiment, the POS printer includes a central processing unit and memory and generates the second print data or second print file indicated above as being generated by the incentive CS. The POS printer does so by either concurrently processing individual transaction data to generate the default print file and the second print file, or by first generating the default print file and sequentially thereafter generating the second print file. Of course, the POS printer stores the code containing the business rules associated with the incentive computer, and the data associated with the incentive computer indicated above.

Timing

The predetermined period of time is preferably set to be a time during which a delay will not cause reduced efficiency or annoyance to customers completing a transaction at the POS. If the POS printer received a print file from the incentive CS within the specified period of time, the POS printer proceeds to print the print file received from the incentive CS and not print the print file received from the POS terminal.

The incentive CS receives individual transaction data for an individual transaction during or after the end of the individual transaction. The incentive CS may obtain the individual transaction data for the individual transaction from a network connection of the type described above while the transaction is occurring. Alternatively, the incentive CS may receive an individual transaction data file for the individual transaction, once that transaction is completed, from one of the other network nodes, including the store controller CS, the POS terminal, or the POS printer.

At some point, the incentive CS receives data indicating to it that the transaction at the POS has ended (end of transaction data signal, or tender data signal). If the incentive CS completes its business rule processing prior to receipt of the end of transaction data, it awaits that end of transaction data. If the incentive CS has received that end of transaction data prior to completion of processing of its business rules against the transaction data in response to an individual transaction, the incentive CS completes its business rule processing and generates either a second print file or second print data containing sales receipt data, and also additional print information, and transmits that second print file or second print data to the POS printer associated with the POS from which the individual transaction data originated.

Format of Data Sent to the Post Printer

The data that the POS printer receives include reference data specifying objects and print properties stored in the database in the POS printer and a sequence of printing of those objects. For example, the non print file data that the POS printer receives may be in vector graphics form, and the data stored in the database in a color printer may be objects including color objects, referenced in vector graphics files.

Business Rules Implemented in the Incentive CS

The incentive CS may run rules specific to individual UPCs, or any combination of UPC codes. Therefore, upon receipt of each UPC code, the incentive CS may run code implementing certain business rules that do not require prior completion of the customer's order.

The business rules executed by the incentive CS may be implemented against the individual transaction data for the current individual transaction at the POS, or against that data and also against data stored by the incentive CS from prior transactions associated with a CID associated with the current individual transaction data.

For example, a business rule implemented by the incentive CS may provide the consumer a coupon for one brand of a category of products when the consumer has consistently over a period of time purchased another brand in that category of products. That business rule may require examining individual transactions data for prior transactions associated with the CID associated with the current transaction, or both prior transactions data and the current individual transaction data.

For example, a business rule implemented by the incentive CS may be to highlight, enlarge in font size, change font, add a watermark background color, or add branding text, to print in the register receipt for a product identification associated with a certain UPC in the individual transaction data. See for example FIG. 3.

Definition of Additional Print Information

The data stored by the incentive CS may include individual transaction data, business rules data specifying information to include in printing in addition to the conventional the register receipts information. Conventional register receipts information includes product identification, price, quantity, and total cost. This additional information relating to the register receipt is called herein below 'additional print information.' The additional print information results in the second print data and the second print data for an individual transaction being different from the default print file and default print data for that transaction.

The additional print information to include in printing of the register receipt results from applying business rules to the individual transaction data for transactions. This additional print information may include any or all of color, size, and location, of printed text and image data, such as color highlighting of certain product identifications, change in dimension or font type of text associated with certain product descriptions, inclusion of product logos, order of printing of descriptions of products (which ones to print first for higher visibility), and also information for printing coupons and product redemption forms, including coupon and redemption form product identifications, and amount of coupon or redemption form value.

The incentive CS applies the business rules to either generate a second print file in which the additional print information has been used to specify the second print file or generate second print data instructions used by the printer to generate and print, including printing of data objects stored in a database in the POS printer.

For example, the business rules may result in additional print information specifying highlighting with a water mark, a certain color border, a certain color text, a font, a character code size, text or graphics, and text or graphics objects to include in print.

Skippy Example

As a concrete example, one business rule is to print the portion fo the register receipt containing identification of a particular Skippy brand peanut butter product item showing the item description (Skippy 12 Oz bottle) and cost along with a light blue background, a foreground image of a can of Skippy peanut butter, and the statement "More Skippy has been sold than any other peanut butter in the world!" See FIG. 3. The light blue background water mark, the foreground image of the can of Skippy, and the text statement are additional print information; not information that would be printed by a default print. One benefit of such graphical highlighting is increased consumer recognition of manufacturer, brand name, product name, trademark, or trade dress.

Central CS

The business rules and data applicable to the incentive CS and the POS printer may be periodically or aperiodically updated. The updates may be transmitted from the central CS to each incentive CS in each retail store, to each store controller CS, and each networked POS printer. The updates include be new business rules for the incentive CS to implement sent to the incentive CS, reference identifications for data objects which are transmitted to both the incentive CS and the POS printer, and corresponding data objects transmitted to the POS printer.

In addition, the central CS could transmit to each incentive CS, each store controller POS, each POS printer, or to a central retail store CS, changes and updates to retailer product descriptions. The central CS can receive retailer specific updates via communication from a master retailer CS via the Internet.

Validation Checks

The incentive CS may perform pre business rule validation checks on the transaction data it receives. These validation checks may include (1) that all UPCs in the transaction data are in the incentive CSs local database and (2) that transaction data received by it for the same transaction from two different sources (such as the POS terminal and the store controller CS), contained the same data. If the incentive CS determines a discrepancy between two data sets, it may not generate and send a print file or print data to the POS printer. Instead, it may send a non validation signal to the POS printer, and the POS printer may be configured to respond by printing the print file or print data it previously received from the store controller POS in response to receipt of the non validation signal.

Related Invention

In a related invention, retailer computer system 10 is configured to always print on the POS printer the default print file or default print data. In addition, the POS printer is configured to thereafter print a second print file if the POS printer receives the second print file within the wait time period. In this related invention, retail store CS generates a second print file or second print data which does not instruct the POS printer to print register receipt information contained in printing of the default. Instead, the second print file or second print data only instructs the POS printer to print information in addition to the default register receipt information, including specifically coupons resulting from processing individual transaction data by the retail store CS and awards determined by the CID associated with each individual transaction and a lookup table of CIDs and associated awards.

ASPECTS OF THE INVENTION

In one aspect, the invention provides a system and computer implemented method for printing information, comprising:

receiving in a POS terminal of a POS of a first retail store individual transaction data for an individual transaction;

generating from said individual transaction data for said individual transaction either a default print file or default print data for printing a sales receipt for said individual transaction;

printing from a POS printer, if said POS printer at said POS receives a second print file or second print data associated with said individual transaction data prior to expiration of a wait period of time associated with at time of said individual transaction, using said second print file or said second print data;

printing from said POS printer, if said POS printer does not receive said second print file or said second print data prior to expiration of said wait period of time, using said default print file or said default print data.

In another aspect, the invention provides a computer implemented system and method for printing information, comprising:

receiving, in a POS terminal of a retail store CS at a POS in a retail store, individual transaction data for an individual transaction;

generating from said individual transaction data for said individual transaction a default print file or default print data for printing a sales receipt for said individual transaction;

printing, using said default print file or said default print data, said sales receipt at a POS printer;

printing from said POS printer, using a second print file or second print data, at least one coupon, only if said POS printer receives said second print file prior to expiration of a specified wait period of time.

Other dependent aspects are described below and appear in the dependent claims.

BRIEF DESCRIPTION OF THE DRAWINGS

The invention is also described with reference to the following figures.

DETAILED DESCRIPTION OF THE PREFERRED EMBODIMENTS

FIG. 1 shows computer network 1 including retail store CS 10, manufacturer CS 20, central CS 30, master retailer CS 40, and network 150. Preferably network 1 is the Internet. Retailer store CS includes one or more CS for logging and audit tracking transactions in the corresponding retail store, and running business rules implementing printing at retail store printers, among other things. Each noted CS may include several individual computers networked together. Locally networked computers and computer systems networked via network 50 connect via network communications lines 50. Each of the networked CSs includes hardware and software for implementing packet switched network communication protocols, such as TCP/IP.

Central CS 30 includes a database storing data received from a plurality of retail store CSs. This data includes individual transaction data, awards log data, and it may include printer description data and printer software data, such as printer drivers.

Manufacturer CS 20 may include manufacturer data specifying manufacturers products, coupons or advertising to associate with that product, and may also include manufacturer criteria applicable to purchase history data (historical individual transaction data) associated with a CID indicating if that CID qualifies for the coupons or advertising. Central CS preferable includes code for receiving that data from the manufacturer CSs for multiple manufacturers, and applying the foregoing manufacturer criteria to transaction data, generating corresponding awards data (awards in association with the CID), and transmitting the awards data to the retail store CS associated by the central CS with the CID.

Retail store CS 10 includes code for logging transactions occurring in the POSs of the corresponding retail store, generating a default print file for individual transaction data for each individual transaction, generating a second print file for individual transaction data for each individual transaction, determining if CIDs associated with individual transaction data for each individual transaction qualify for awards, and printing a register receipt and awards data. A POS printer prints the register receipt based upon either the default print of second print file or data. The POS printer or a second marketing printer optionally prints awards associated with the individual transaction data for an individual transaction, after the retail store CS 10 determines awards for which that CID and that individual transaction qualify.

Master retailer CS optionally receives transaction data from retail store CS 10 and sends retail store CS 10 updates to product descriptions, UPCs, and other information. Central CS 30 may alternatively perform any of these functions.

Figure 1A:
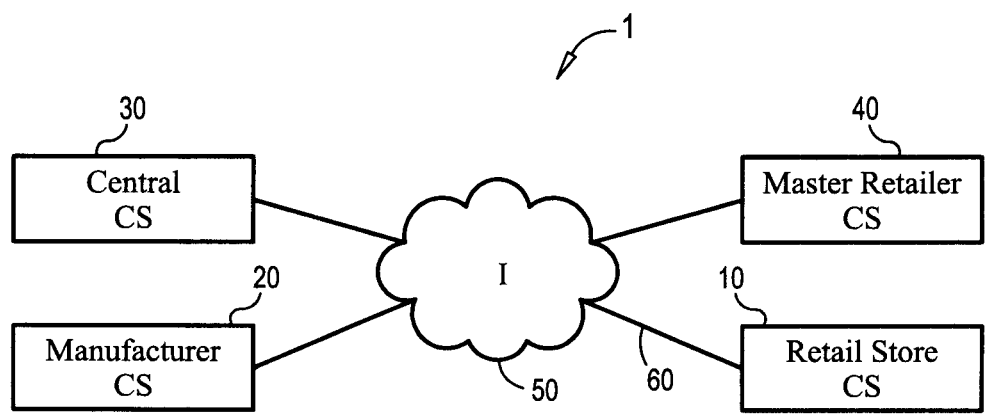
FIGS. 1A-1D is a schematic of a novel computer network system.
Figure 1B:
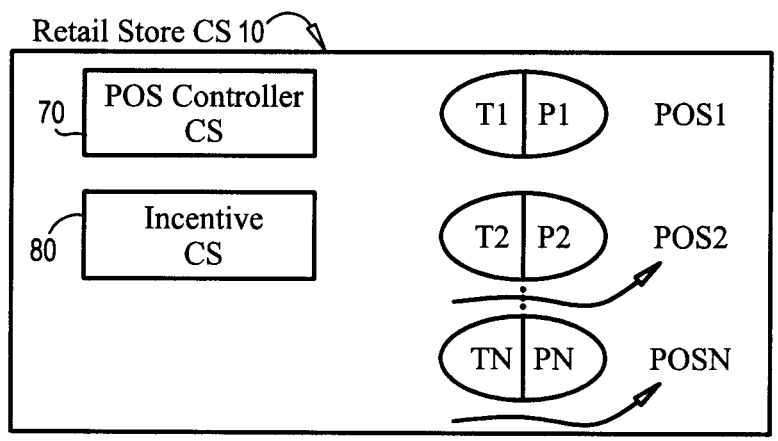
Figure 1C:
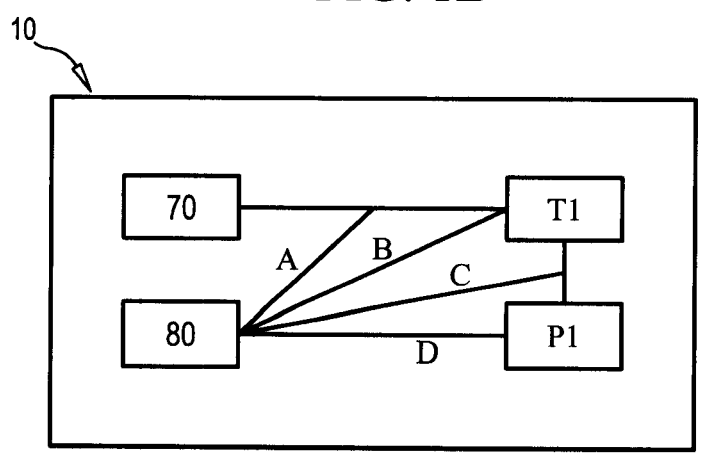
Figure 1D:
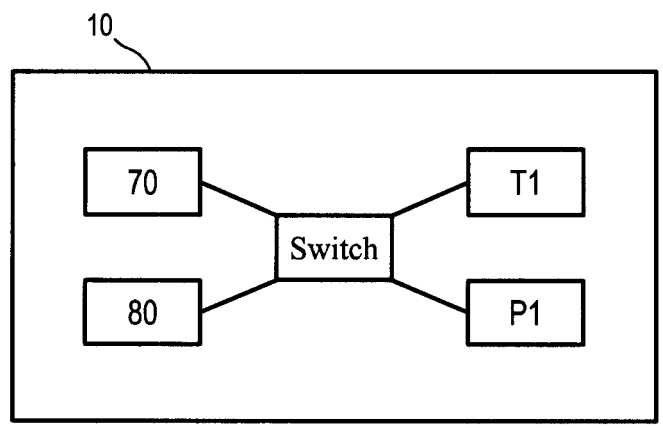

FIGS. 1B-1D show alternative embodiments of networking of elements of retail store CS 10. In each embodiment, there exists POS controller CS 70, incentive CS 80, a set of POSs, such as POS1 at which reside POS terminal T1, and printer P1, POS 2 at which there exists POS terminal T2 and printer P2, etc.

FIG. 1B shows retail store CS with terminal T1 and printer P1 at POS1, etc. It also shows no express network connection, indicating that all elements of the retail store CS may communicate with one another.

FIG. 1C illustrates four network configuration embodiments of retail store CS 10 labeled A-D indicating different network connections of incentive CS 80. In embodiments A-D respectively, incentive CS 80: connects to the communication path between POS controller CS 70 (A); connects to POS terminal T1; connects to the communication path between POS terminal T1 and printer P1; and connect to printer P1.

FIG. 1D illustrates that all network components of retail store CS 10 may be connected to a network switch.

Printer P1 may be a local printer controlled by POS terminal T1, or it may be a network addressable node in the retail store CS local area network.

Figure 2:
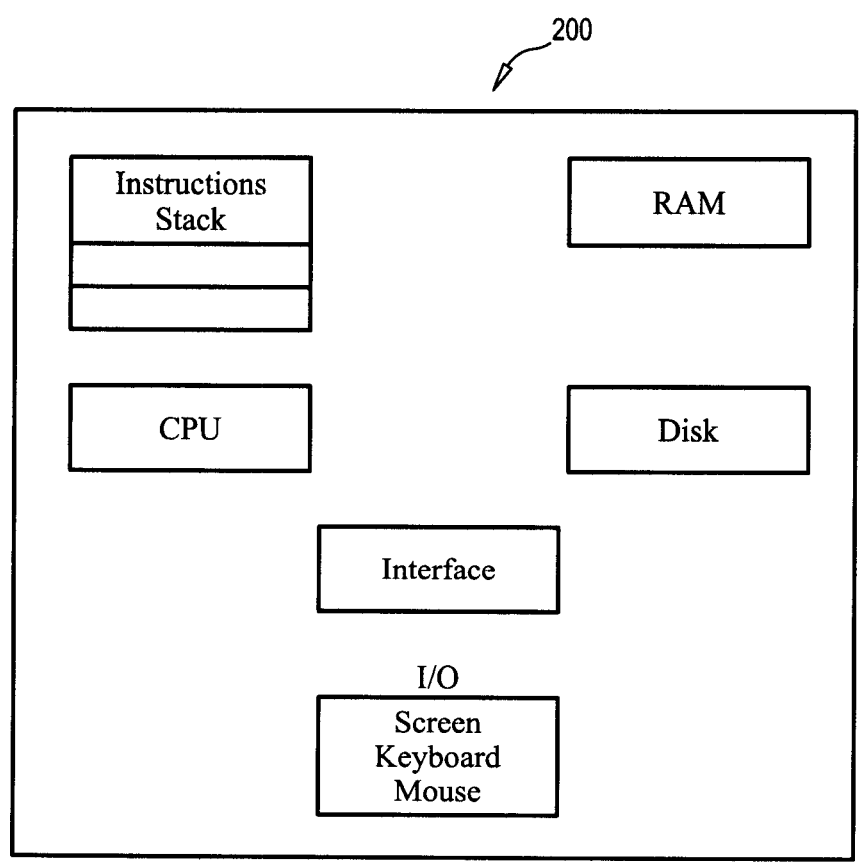
FIG. 2 is a schematic of a conventional digital computer.

FIG. 2 shows elements of a conventional digital computer 20 including a CPU processing instructions in an instruction stack, random access memory (RAM), disk memory (DISK), input output structure (I/O elements including for example a screen display, keyboard, and mouse), and interface electronics interfacing the components to one another, and operating system code for coordinating activities of each of the elements. Processing and generating herein refer to functions associated with the CPUs implementing instructions, typically on transaction data.

Figures 3, 4:
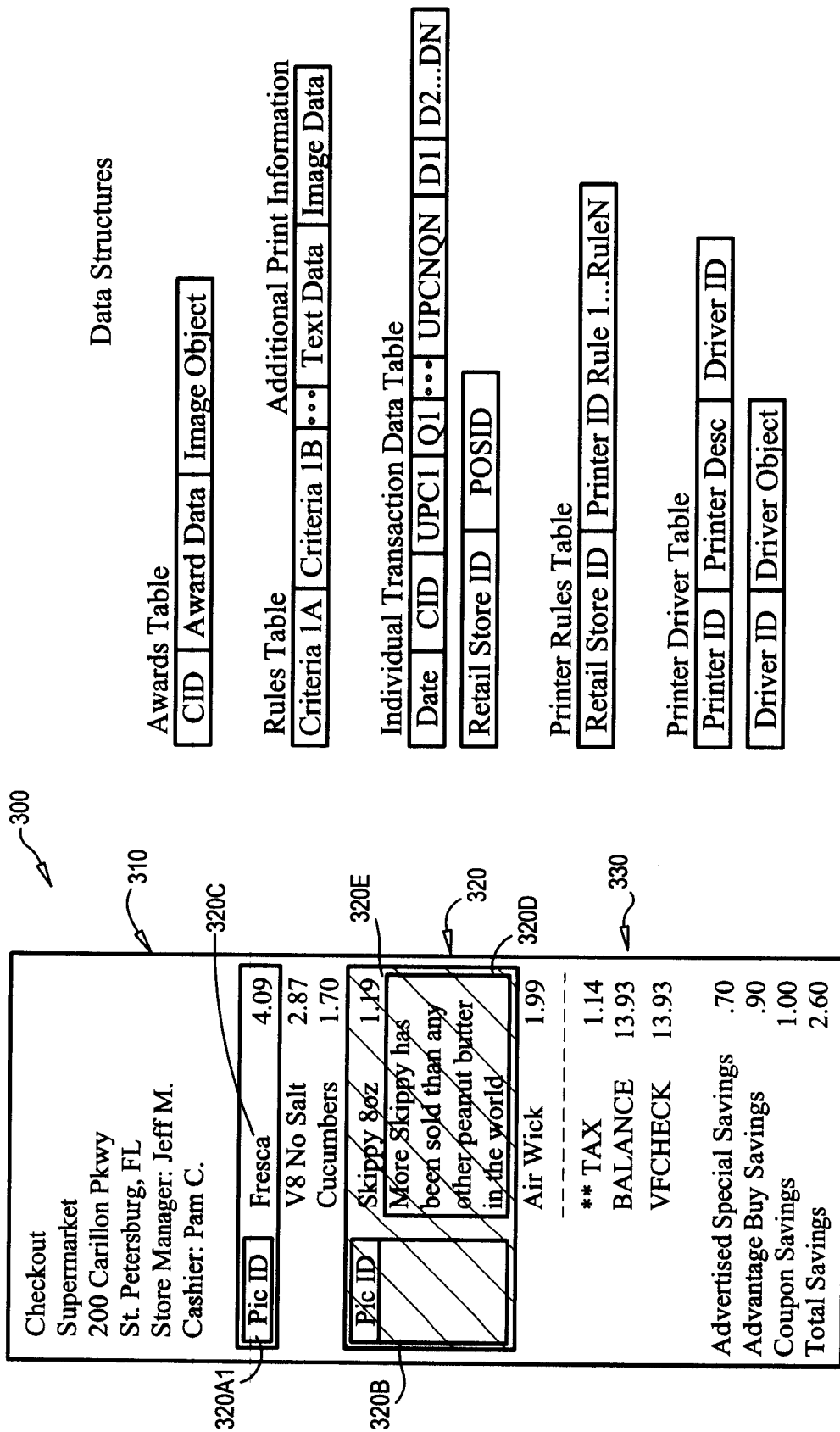
FIG. 3 is a mock up in black and white of a color register receipt resulting from implementation of the disclosed invention.
FIG. 4 are data structures for storing data relevant to implementing the disclosed invention.
Figure 5A:
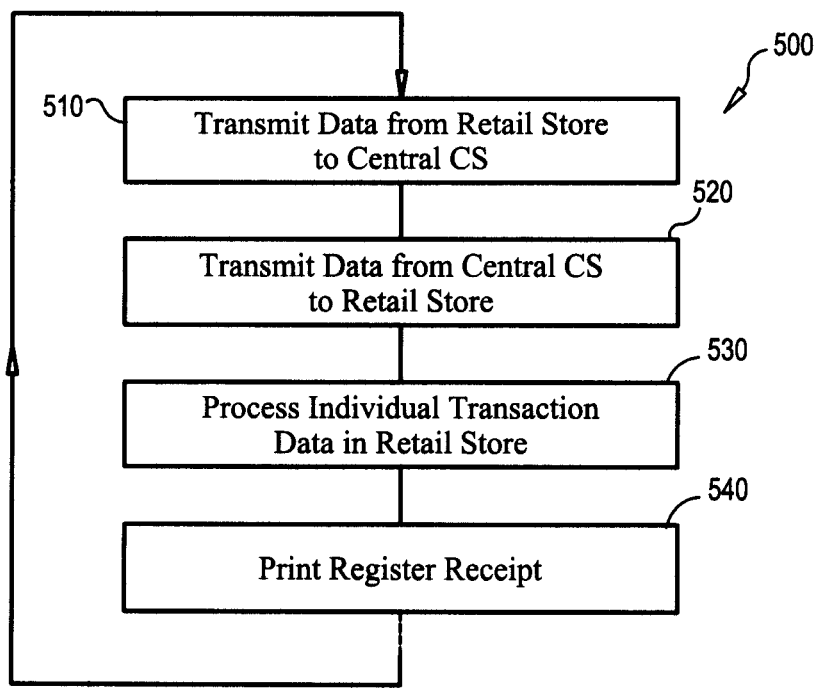
FIGS. 5A-5D are flow charts showing steps implementing the disclosed methods.
Figure 5B:
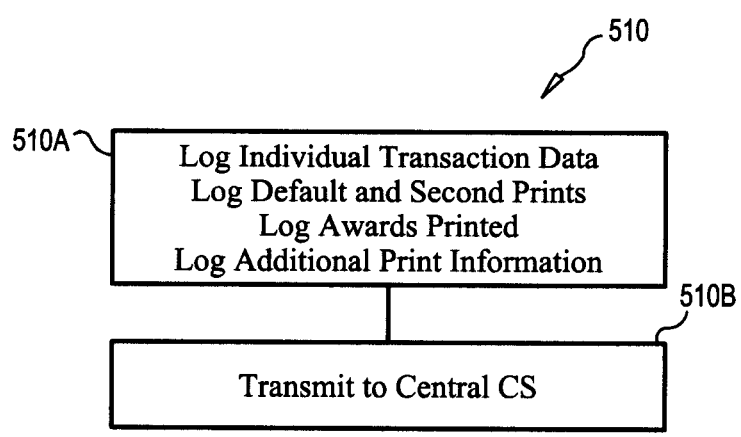
Figure 5C:
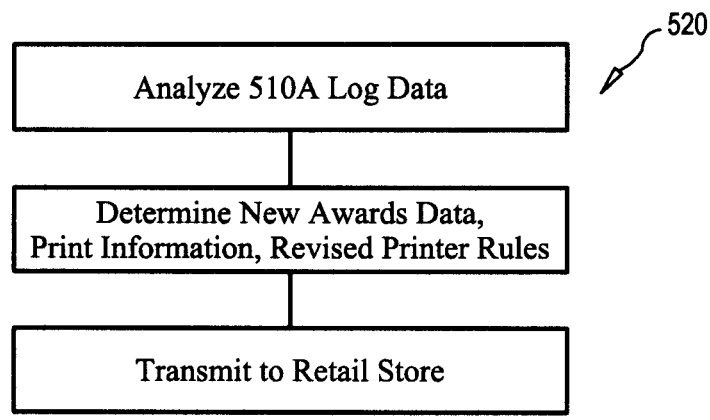
Figure 5D:
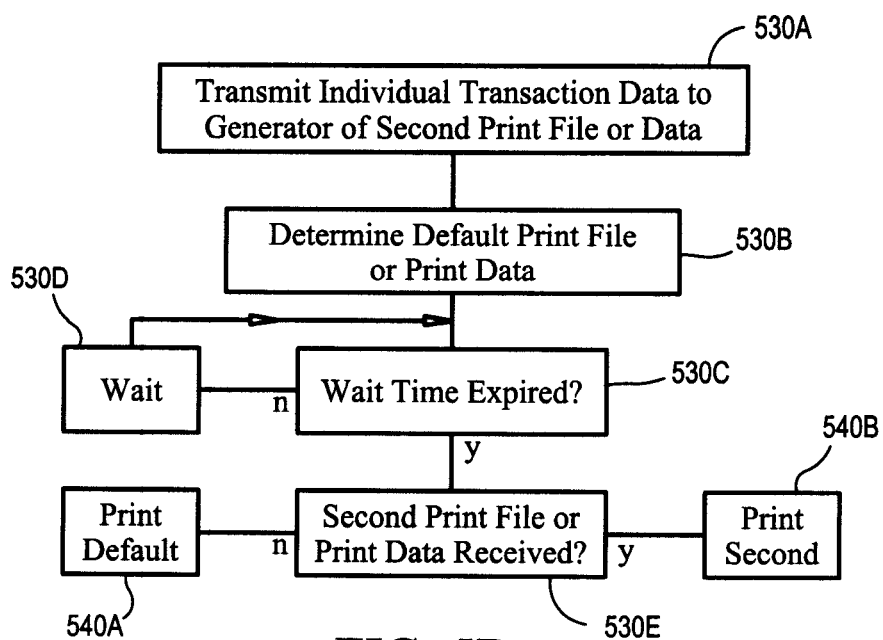

FIG. 3 shows exemplary register receipt 300 (also called a sales receipt) printed by the disclosed method. Register receipt 300 includes printed segments corresponding to data fields for store identification 310 (name, address, manager name, cashier name), printed segments corresponding to data fields for purchased product information 320 (in line image data objects, large image data objects, product descriptions, large image additional descriptions, product description formatting, product price, and text coloring, and background coloring such as water marks), data fields for transaction summary information 330 (tax, balance, payment type), and data fields for discount information 340 (discount description and discount amount, total discounts).

The printed segments corresponding to data fields for purchased product information 320's in line image data objects correspond for example to the image "Pic ID" 320A; for large image data objects correspond for example to "Pic ID" 320B, for product descriptions correspond for example to "Fresca" 320C, for large image additional descriptions for example to "More Skippy has been sold than any other peanut butter in the world" 320D, product description formatting for example to the relative locations of the information corresponding to the Skippy product, and coloring corresponding for example to watermark 320E, indicated by slanted lines, over the information for the Skippy product. The enlarged size of the information relating to the Skippy product and the distinct coloring (such as water marking) associated therewith makes the Skippy related information more discernable to a viewer.

Optionally, coupons may be printed on the printer printing the register receipt, on the same paper tape on which the register receipt 300 is printed. Preferably, such coupons are printed before or after regions 310-330. The coupons so printed may be based upon processing by retail store CS 10 is described above.

The invention claimed is:

1. A computer implemented method for printing information, the method being implemented by a computer system of a retail store, the computer system having a point-of-sale terminal and a point-of-sale printer, the method comprising: generating, by the point-of-sale terminal, default print information, which includes individual transaction data to be printed on a sales receipt, for an individual transaction; receiving, by said point-of-sale printer, said default print information from said point-of-sale terminal; transmitting, by the point-of-sale terminal, said individual transaction data to said generating computer system to generate said second print information, wherein said generating computer system identifies the at least one incentive based on at least a portion of the individual transaction data; determining, by said generating computer system, whether a predetermined send time associated with said individual transaction data has passed; responsive to a determination by said generating computer system that the predetermined send time has passed, not transmitting, by said generating computer system, said second print information to said point-of-sale printer; and responsive to a determination by said generating computer system that the predetermined send time has not passed, transmitting, by said generating computer system, said second print information to said point-of-sale printer; determining, by said point-of-sale printer, whether said point-of-sale printer receives, from a generating computer system separate from said point-of-sale terminal and separate from said point-of-sale printer, second print information, which includes said individual transaction data to be printed on the sales receipt and incentive data for at least one incentive to be printed on the sales receipt, prior to expiration of a wait period of time associated with a time of said individual transaction, wherein the incentive data indicates a value of the at least one incentive to be printed on the sales receipt; printing, by said point-of-sale printer, the sales receipt based on said second print information instead of said default print information responsive to a determination that said point-of-sale printer receives said second print information from said generating computer system prior to expiration of said wait period of time; and printing, by said point-of-sale printer, said sales receipt based on said default print information responsive to a determination that said point-of-sale printer does not receive said second print information from said generating computer system prior to said expiration of said wait period of time.

2. The method of claim 1, wherein said generating computer system is an incentive computer system.

3. The method of claim 1, wherein said point-of-sale printer is a color printer.

4. The method of claim 1, wherein said second print information comprises additional print information not included in the default print information.

5. The method of claim 1, wherein said default print information comprises a first arrangement of print segments, and said second print information comprises a second arrangement of print segments.

6. The method of claim 4, wherein said additional print information comprises at least one of an image, text, color of printed text, color of printed image data, size of printed text, size of printed image data, location of printed text, location of printed image data, color highlighting of a product identification, change in dimension or font type of text associated with a product description, a product logo, order of printing of a product description, a coupon, or a product redemption form.

7. The method of claim 4, wherein said additional information comprises data that specifies a watermark to be printed in association with a product identification that is to be printed on the sales receipt.

8. The method of claim 4, wherein said additional print information comprises text including a statement about a product.

9. The method of claim 1, further comprising:
receiving, by said generating computer system, from a central computer system business rules for determining additional information to print on said sales receipt.

10. The method of claim 1, further comprising:
transmitting to a central computer system transaction data for at least one individual transaction in said retail store.

11. A computer implemented system for printing information, comprising: a point-of-sale terminal programmed to: generate default print information, which includes individual transaction data to be printed on a sales receipt, for an individual transaction; transmit said individual transaction data to said generating computer system to generate said second print information, wherein said generating computer system identifies the at least one incentive based on at least a portion of the individual transaction data;
a generating computer system programmed to: determine whether a predetermined send time associated with said individual transaction data has passed; responsive to a determination by said generating computer system that the predetermined send time has passed, not transmit said second print information to said point-of-sale printer; and responsive to a determination by said generating computer system that the predetermined send time has not passed, transmit said second print information to said point-of-sale printer; a point-of-sale printer programmed to: receive said default print information from said point-of-sale terminal; determine whether said point-of-sale printer receives, from a generating computer system separate from said point-of-sale terminal and separate from said point-of-sale printer, second print information, which includes said individual transaction data to be printed on the sales receipt and incentive data for at least one incentive to be printed on the sales receipt, prior to expiration of a wait period of time associated with a time of said individual transaction, wherein the incentive data indicates a value of the at least one incentive to be printed on the sales receipt; print said sales receipt for said individual transaction based on said second print information instead of using said default print information responsive to a determination that said point-of-sale printer receives said second print information from said generating computer system prior to expiration of said wait period of time; and print said sales receipt using said default print information responsive to a determination that said point-of-sale printer does not receive said second print information prior to said expiration of said wait period of time.

12. The system of claim 11, wherein said generating computer system is an incentive computer system.

13. The system of claim 11, wherein said point-of-sale printer is a color printer.

14. The system of claim 11, wherein said second print information comprises additional print information not included in the default print information.

15. The system of claim 11, wherein said default print information comprises a first arrangement of print segments, and said second print information comprises a second arrangement of print segments.

16. The system of claim 14, wherein said additional print information comprises at least one of an image, text, color of printed text, color of printed image data, size of printed text, size of printed image data, location of printed text, location of printed image data, color highlighting of a product identification, change in dimension or font type of text associated with a product description, a product logo, order of printing of a product description, a coupon, or a product redemption form.

17. The system of claim 14, wherein said additional information comprises data that specifies a watermark to be printed in association with a product identification to be printed on the sales receipt.

18. The system of claim 14, wherein said additional print information comprises text including a statement about a product.

19. The method of claim 1, further comprising:
transmitting said individual transaction data to a point-of-sale controller computer system.

20. The method of claim 9, wherein said business rules are applied to said individual transaction data.

21. The system of claim 11, further comprising:
a point-of-sale controller computer system.

22. A system of providing incentive information to be printed in association with a sales receipt at a point-of-sale printer that prints either default print information comprising the transaction information or second print information comprising transaction information and incentive data, the system comprising: a computing system, remote from the point-of-sale printer, comprising one or more physical processors programmed by one or more computer program instructions that, when executed by the one or more physical processors, program the computing system to: obtain transaction information related to a transaction, wherein the transaction information is to be printed on a sales receipt for the transaction; identify at least a first incentive wherein the first incentive is based on at least a portion of the transaction information; determine whether a predetermined send time associated with the transaction information has passed; cause second print information, which includes the transaction information to be printed on the sales receipt and incentive data for at least the first incentive to be printed on the sales receipt, to be transmitted to the point-of-sale printer remote from the computing system responsive to a determination that the predetermined send time has not passed, wherein the incentive data indicates a value of the at least one incentive to be printed on the sales receipt; and not cause the second print information to be transmitted responsive to a determination that the predetermined send time has passed.

23. The system of claim 22, wherein the transaction information is obtained from a point-of-sale printer at a retail store.

24. The system of claim 22, wherein the transaction information is obtained from a point-of-sale terminal at a retail store.

25. The system of claim 22, wherein the transaction information is obtained from a central computer at a retail store, wherein the central controller is coupled to at least two point-of-sale terminals at the retail store.

26. The system of claim 22, wherein the computing system is further programmed to determine that the predefined wait period has expired based on a time when the transaction information is first received.

27. The system of claim 22, wherein the computing system is further programmed to:
obtain an end of transaction signal that indicates the end of the transaction; and
determine that the predefined wait period has expired based on a time after the end of the transaction.

28. The system of claim 22, wherein the second print information comprises a second print file or second print data.

29. The system of claim 22, wherein the second print information includes the transaction information and replaces default print information that is used to print a first register receipt for the transaction, and wherein the second print information is used to print a second register receipt for the transaction instead of the first register receipt.

30. The system of claim 29, wherein the computing system is further programmed to provide additional information on the second register receipt relative to the first register receipt.

31. The system of claim 30, wherein the additional information includes highlighting arranged so as to be printed in association with an item on the second register receipt, wherein the item is not highlighted on the first register receipt.

32. The system of claim 30, wherein the additional information includes the at least one incentive arranged so as to be printed in association with an item on the second register receipt, wherein the at least one incentive is not arranged so as to be printed in association with the item on the first register receipt.

33. The system of claim 30, wherein the additional information includes an image of an item arranged so as to be printed in association with the item on the second register receipt, wherein the image is not arranged so as to be printed in association with the item on the first register receipt.

34. A printer programmed to print incentive information in association with a sales receipt by printing either default print information comprising the transaction information or second print information comprising transaction information and incentive data, the printer comprising: one or more processors programmed by one or more computer program instructions to: receive default print information that includes transaction information for a transaction and is used to print a receipt for the transaction; determine whether second print information is obtained within a predefined wait period from a generating computer system remote from the printer, wherein the generating computer system identifies at least one incentive to be printed on the sales receipt based on at least a portion of the transaction information and provides the second print information to the printer responsive to a determination that a predetermined send time associated with the transaction has not expired and does not provide the second print information to the printer responsive to a determination that the predetermined send time has expired, wherein the second print information includes the transaction information and incentive data for the at least one incentive related to the transaction information, wherein the second print information is used, instead of the default print information, to print the receipt for the transaction, and wherein the incentive data indicates a value of the at least one incentive; print the receipt based on the default print information responsive to a determination that the second print information is not received before expiration of the predefined wait period; and print the receipt and the at least one incentive based on the second print information instead of the default print information responsive to a determination that the second print information is received before the expiration of the predefined wait period.

35. The method of claim 1, further comprising:
determining, by said generating computer system, whether to transmit to said point-of-sale printer said second print information, which includes said individual transaction data to be printed on the sales receipt and said incentive data for at least one incentive to be printed on the sales receipt.

36. The system of claim 11, wherein said generating computer system is programmed to:
determine whether to transmit to said point-of-sale printer said second print information, which includes said individual transaction data to be printed on the sales receipt and said incentive data for at least one incentive to be printed on the sales receipt.

37. The method of claim 1, further comprising:
formatting, by said point-of-sale printer, said default print information for printing responsive to a determination that said point-of-sale printer does not receive said second print information from said generating computer system prior to said expiration of said wait period of time; and
formatting, by said point-of-sale printer, said second print information for printing instead of said default print information responsive to a determination that said point-of-sale printer receives said second print information from said generating computer system prior to expiration of said wait period of time.

38. The system of claim 11, wherein said point-of-sale printer is further programmed to:
format said default print information for printing responsive to a determination that said point-of-sale printer does not receive said second print information from said generating computer system prior to said expiration of said wait period of time; and
format said second print information for printing instead of said default print information responsive to a determination that said point-of-sale printer receives said second print information from said generating computer system prior to expiration of said wait period of time.

39. The printer of claim 34, wherein the one or more processors are further programmed to:
format the default print information for printing responsive to a determination that the second print information is not received before expiration of the predefined wait period; and
format the second print information for printing instead of the default print information responsive to a determination that the second print information is received before the expiration of the predefined wait period.

* * * * *